UNITED STATES PATENT OFFICE.

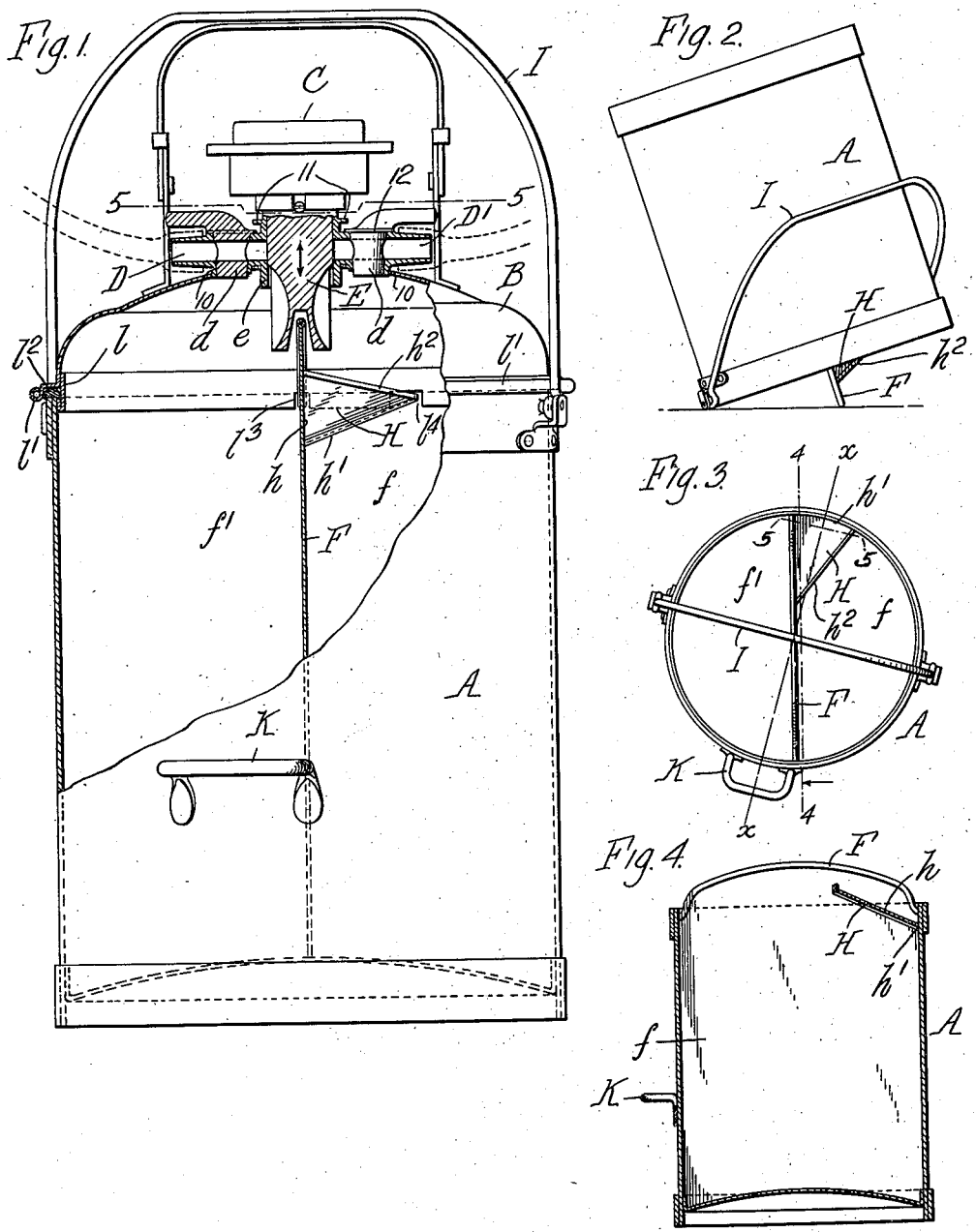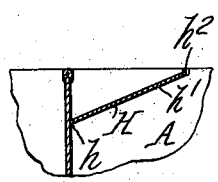

CHARLES B. DALZELL, OF LITTLE FALLS, NEW YORK, ASSIGNOR TO D. H. BURRELL & COMPANY, OF LITTLE FALLS, NEW YORK.

MILKING-MACHINE.

1,296,166.  Specification of Letters Patent.  Patented Mar. 4, 1919.

Application filed March 24, 1917. Serial No. 157,087.

*To all whom it may concern:*

Be it known that I, CHARLES B. DALZELL, a citizen of the United States, residing at Little Falls, in the county of Herkimer and State of New York, have invented a new and useful Improvement in Milking-Machines, of which the following is a specification.

This invention relates to improvements in milking machines and more particularly in milking machines of that sort adapted to simultaneously milk two cows, in which the receiving pail is divided by a partition into two compartments so as to keep the milk from the cows separate. Heretofore, it has been usual to provide these compartment pails with pouring spouts arranged at one side thereof at opposite sides of the partition to enable the milk to be poured simultaneously from both compartments of the pail into two buckets or receptacles standing side by side, and the milker pail has been made of upwardly tapering form or with a top portion of smaller diameter than the bottom of the pail. This was to make the pail stable and give it a fair capacity and at the same time reduce the size of the pulsator or milking mechanism on top of the pail to what was considered a good practical size. The large bottom of the pail also served to protect the projecting pouring spouts from injury by contact with an object.

Milking machine pails of this construction, however, have serious disadvantages. It is difficult to properly clean and wipe out the pails on account of the small size of the upper ends of the compartments and air does not circulate in the pail so as to thoroughly dry it when the pail is inverted after washing. This type of partitioned pail is also much more expensive and difficult to manufacture and requires more stock for a pail of the same capacity than a straight sided or cylindrical pail in which the partition is of like width from end to end. On the other hand, projecting, pouring spouts would be objectionable on a straight sided or cylindrical pail because they would not be protected and would be apt to be struck and injured.

The objects of this invention are to produce a practical and desirable compartment milking machine pail, preferably of straight sided or cylindrical form, having a pouring deflector so arranged as to enable the milk to be readily poured simultaneously from the two compartments of the pail and both compartments to be completely drained; also to provide the pail with a partition which projects above the rim of the pail so that the pail can be placed upside down and be held by the partition in a tilted position, which enables free circulation of air in the compartments of the pail and insures thorough drying of the same after the pail has been washed; also to improve milking machines in the other respects hereinafter described and set forth in the claims.

In the accompanying drawings:—

Figure 1 is an elevation, partly in section, of a milking machine embodying the invention.

Fig. 2 is an elevation, on a reduced scale of the milker pail inverted for draining and drying it.

Fig. 3 is a plan view, reduced, of the pail with the cover and pulsator removed.

Fig. 4 is a sectional elevation of the pail in line 4—4, Fig. 3.

Fig. 5 is a sectional elevation of the pail on line 5—5, Fig. 3 on an enlarged scale.

A represents the pail or milk receptacle of the milking machine, B the cover or top for the pail and C the pulsator mounted on the cover B, which thus constitutes the supporting base for the pulsator or milking mechanism. The pulsator or milking mechanism, and the stop cocks or valves $d$ for the nipples or connections D D' to which the milk tubes are connected, may be of any usual or suitable construction. E is the usual pulsator piston which reciprocates in an open bottomed cylinder $e$ for causing pulsations in the teat cups. The milk pail, as usual, is divided by a partition F into two compartments $f$ $f'$ for separating the milk from the two cows, and the pulsator piston is located above this partition and is constructed to deliver the milk from the two milk connections D D' into the two compartments of the pail.

The milk pail A is preferably of substantially cylindrical shape or of substantially the same diameter from top to bottom, and may be of any suitable construction. The cylindrical pail with the partition of substantially equal width from end to end is more easy and economical to manufacture than a small top pail, and this form enables the upper ends of the compartments to be made large enough to afford ready access to the compartments for washing and wiping them. The partition F preferably has a curved or arched upper edge which projects upwardly above the rim or upper end of the pail and slopes downwardly from its middle portion, joining the wall of the pail substantially flush with its rim or upper edge.

H represents a pouring deflector which is located in the upper end of the compartment $f$ of the pail for the purpose of directing the stream of milk from this compartment when emptying the pail. This deflector extends inwardly from the cylindrical wall of the pail at one side only of the partition, there being no deflector for the compartment $f'$ at the opposite side of the partition. Preferably that edge $h$ of the deflector which joins and is soldered or otherwise suitably secured to the partition, inclines upwardly and inwardly from its outer end which is below the rim of the cylindrical wall of the pail to its inner end which is above the rim of the pail, as clearly shown in Fig. 4. The outer edge $h'$ of the deflector which joins and is soldered or otherwise suitably secured to the cylindrical wall of the pail preferably slopes upwardly from the partition F to a point substantially flush with the upper edge of the rim of the pail, as shown in Figs. 1 and 5. The deflector is also preferably provided along its remaining edge, which extends at an angle from the partition to the wall of the pail, with an upturned lip or flange $h^2$. When the milk is being poured from the pail the deflector H deflects the milk from the compartment $f$ in which it is located away from the partition F, thus keeping the streams of milk discharging from the two compartments separate, and enabling the milk to be simultaneously poured from the two compartments into two receptacles standing side by side. As the deflector is located at one side only of the partition it is very easy to completely empty or drain both compartments of the pail, because the milk will readily drain from the compartment $f'$ in which there is no deflector and the pail can then be tilted slightly to one side to completely drain the compartment $f$ in which the deflector is located. In this respect a pail having the single deflector at one side only of the partition is much more convenient to use than a pail having a deflector extending to opposite sides of the partition. With such a double deflector it is necessary to tilt the pail first in one direction and then the other to empty the two compartments and it is quite bothersome to completely drain all of the milk from both of the compartments. In order to facilitate the pouring of the milk from the pail, the carrying bail I is preferably pivoted to the pail in a plane perpendicular to a line $x$—$x$, Fig. 3, extending through the center of the partition and through the middle of the outer edge $h'$ of the deflector H, and the pail is provided with a pouring handle K which is located at the opposite side of the pail from the deflector.

Since the partition F projects above the upper end or rim of the pail, the pail can be stood upside down in a tilted position, as indicated in Fig. 2, in which it rests on the partition and one side of the rim of the pail. In this position, the pail will drain and air can freely enter and circulate in both compartments of the pail, thus insuring the proper drying of the pail after washing it. The projecting partition also assists in preventing injury to the rim of the pail, which should be kept intact to insure a tight joint with the cover.

The pail cover or pulsator base B is preferably of dome shape or of arched form in cross section with its middle portion highest so that the pulsator which is carried by the cover is supported well above the rim of the pail A and ample air space is left in the cover above the rim of the pail to prevent the foam or milk from being drawn up into the vacuum connections when the pail is full. The rim of the cover can be constructed in any suitable way to fit the pail and insure an air tight joint between the cover and the pail. As shown, the cover is provided with a vertical rim flange $l$ which extends down inside of the rim of the pail and with a flange $l'$ which projects outwardly and downwardly over the rim of the pail. $l^2$ is a packing gasket confined in the groove formed between the flanges $l$ and $l'$ and adapted to bear on the rim of the pail to form an air tight joint between the cover and the pail. The depending flange $l$ of the cover shown is notched at $l^3$ $l^4$, Fig. 1, to fit over the edges of the partition and deflector. As the cover is dome-shaped or arched it can be made of much lighter or thinner material than a flat cover of equal diameter and nevertheless have adequate strength to withstand the atmospheric pressure on the same, which is very great when the machine is in operation and a partial vacuum is maintained in the pail. The cover thus affords a strong rigid support for the milking mechanism without being unduly heavy.

I claim as my invention:

1. A milking machine pail having a partition forming separate compartments in the pail, and a pouring deflector extending inwardly from the upper portion of the wall of said pail at one side only of said partition.

2. A milking machine pail having a partition forming separate compartments in the pail, and a pouring deflector located at the juncture of the upper portion of said partition with the wall of said pail and extending on one side only of said partition.

3. A milking machine pail having a partition forming separate compartments in the pail, and a pouring deflector extending laterally from said partition at one side only thereof and joining the upper portion of the wall of said pail.

4. A milking machine pail having a partition forming separate compartments in the pail, and a pouring deflector extending laterally from said partition at one side only thereof and joining the upper portion of the wall of said pail, said deflector inclining upwardly and inwardly at its juncture with said partition and sloping upwardly away from said partition at its juncture with the outer wall of the pail.

5. A milking machine pail having a partition forming separate compartments in the pail, the upper end of one of said compartments being unobstructed, and a deflector obstructing the upper portion of the other compartment adjacent to the partition, whereby when liquid is poured from the pail the liquid from one compartment will discharge close to the partition and the liquid from the other compartment will be deflected away from the partition.

6. A milking machine pail of substantially the same diameter at top and bottom having a partition forming separate compartments in the pail, and a pouring deflector extending laterally from said partition at the juncture of the upper portion of said partition with the wall of the pail.

7. A milking machine pail having a partition forming separate compartments in the pail and extending above the rim of the pail, whereby when the pail is placed upside down on a support said partition will hold one edge of the pail off of the supporting surface.

8. A milking machine pail having a partition forming separate compartments in the pail and extending above the rim of the pail, said pail being of substantially uniform diameter from end to end.

9. A milking machine pail having a partition forming separate compartments in the pail, said pail being of substantially uniform diameter from end to end, and a pouring deflector extending laterally from said partition and joining the upper portion of the wall of the pail.

10. A milking machine pail having a partition forming separate compartments in the pail and extending above the rim of the pail, and a pouring deflector extending laterally from said partition and joining the upper portion of the wall of the pail.

11. A milking machine pail having a partition forming separate compartments in the pail, a pouring deflector extending laterally from said partition at one side only of said partition, and a carrying bail attached to the pail in a plane substantially at right angles to a radial line extending through the middle of said deflector.

12. In a milking machine, the combination of a pail having a partition dividing the pail into separate compartments, an arched cover closing the upper end of the pail, said partition extending above the rim of the pail into said cover, and a pulsator mounted on said cover.

Witness my hand, this 20th day of March, 1917.

CHARLES B. DALZELL.

Witnesses:
SAMUEL HOUPT,
GEO. I. DALE.